United States Patent [19]
Croft et al.

[11] Patent Number: 5,561,418
[45] Date of Patent: Oct. 1, 1996

[54] LEAK DETECTOR FOR CONDUCTIVE LIQUID BOILER

[75] Inventors: Bryan L. Croft; Howard M. Spackman, both of San Diego, Calif.

[73] Assignee: United States of America as represented by the Secretary of the Navy, Washington, D.C.

[21] Appl. No.: 313,498

[22] Filed: Sep. 22, 1994

[51] Int. Cl.⁶ ................................................ G08B 21/00
[52] U.S. Cl. ...................... 340/605; 73/40.5 R; 340/618; 376/250
[58] Field of Search .................................... 340/605, 618, 340/620, 622; 73/40.5 R, 49.1, 40; 376/250, 251

[56] References Cited

U.S. PATENT DOCUMENTS

| | | |
|---|---|---|
| 3,297,846 | 1/1967 | Peltier . |
| 3,882,382 | 5/1975 | Johnson ................................. 340/605 |
| 4,112,417 | 9/1978 | Himeno . |
| 4,159,447 | 6/1979 | Gernhardt et al. . |
| 4,332,170 | 6/1982 | Belval et al. . |
| 4,814,766 | 3/1989 | Domingue . |
| 5,177,468 | 1/1993 | Baldwin et al. . |

FOREIGN PATENT DOCUMENTS

| | | | |
|---|---|---|---|
| 2455739 | 1/1981 | France ................................. 340/605 |
| 0145959 | 1/1981 | Germany ............................. 340/605 |
| 0037089 | 4/1978 | Japan ................................... 340/605 |
| 0118092 | 10/1978 | Japan ................................... 340/605 |
| 0622877 | 8/1978 | U.S.S.R. ............................... 340/605 |

*Primary Examiner*—Brent A. Swarthout
*Attorney, Agent, or Firm*—Harvey Fendelman; Michael A. Kagan; Eric J. Whitesell

[57] ABSTRACT

A leak detector for detecting a leak of an electrically conductive fluid from a vessel comprises an electrically conductive wire having a melting temperature less than an internal temperature of the vessel and greater than the external temperature of the vessel. The wire is stitched to a heat resistant fabric to hold the wire in place and to thermally and electrically insulate the wire when no leaking fluid is present. Detector means electrically connected to the wire outputs an electrical signal if the wire is fused by leaking fluid permeating the fabric.

4 Claims, 3 Drawing Sheets

LEAK DETECTOR FOR CONDUCTIVE LIQUID BOILER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to detecting a leak in a boiler of an electrically conductive liquid. More specifically, but without limitation thereto, the present invention relates to detecting a leak in a molten lithium boiler and transmitting an alarm signal to a remote location.

Molten lithium boilers are typically used in Rankine cycle engines to power torpedoes such as the MK50. To protect surrounding components from boiler temperatures of up to 2,000 degrees Fahrenheit, the boiler may be insulated with a heat-resistant fabric made from fibers of materials such as silicon dioxide quartz and alumina-boria-silica ceramic. An example of a commercially available heat-resistant fabric is available from JPS Glass Fabrics under the name ASTROQUARTZ. A stainless steel casing may cover the boiler and the insulation to hold the heat resistant fabric in place and to reflect radiant heat away from surrounding components. Leaks in lithium boilers occur frequently, and are consistently observed in the boiler end walls and at the entry points of the boiler injectors.

During the recovery of torpedoes after a test run, there is a hazard to recovery personnel from venting toxic gases if a leak has occurred in the lithium boiler. However, a lithium boiler leak is not discoverable until after the torpedo is recovered. Consequently a leak must be assumed and special equipment and handling procedures must be used to avoid exposing personnel to danger from possible exposure to venting toxic gases during the recovery of a torpedo. Determining whether a leak has occurred during a test before recovering a torpedo would facilitate recovery procedures in instances where no leak has occurred and extra precautions are unnecessary. A need therefore exists for a means of determining whether a boiler leak has occurred before the recovery of a spent torpedo and in other applications where molten metal boilers may present a hazard to personnel if a leak occurs. The present invention is directed to these needs and may provide further related advantages.

SUMMARY OF THE INVENTION

The presently preferred embodiment described below of a leak detector of an electrically conductive liquid is directed to detecting a leak in a molten lithium boiler, and does not preclude other embodiments and advantages of the present invention that may exist or become obvious to those skilled in the art.

A leak detector of an electrically conductive fluid from a vessel comprises an electrically conductive wire that fuses upon contact with the fluid. The wire is stitched with heat resistant thread onto a heat resistant, electrically insulating fabric to form a leak sensor. Detector means electrically connected to the leak sensor outputs an electrical signal in response to an open circuit in the leak sensor when the wire fuses.

An advantage of the leak detector is that the occurrence of a leak of electrically conductive liquid may be detected and communicated to an operator to determine when equipment handling precautions are necessary to protect personnel from the danger of venting toxic gases.

The features and advantages summarized above in addition to other aspects of the present invention will become more apparent from the description, presented in conjunction with the following drawings.

DESCRIPTION OF THE INVENTION

The following description presents the best mode currently contemplated for practicing the present invention. This description is not to be taken in a limiting sense, but is presented solely for the purpose of disclosing how the present invention may be made and used. The scope of the invention should be determined with reference to the claims.

Figure 1:
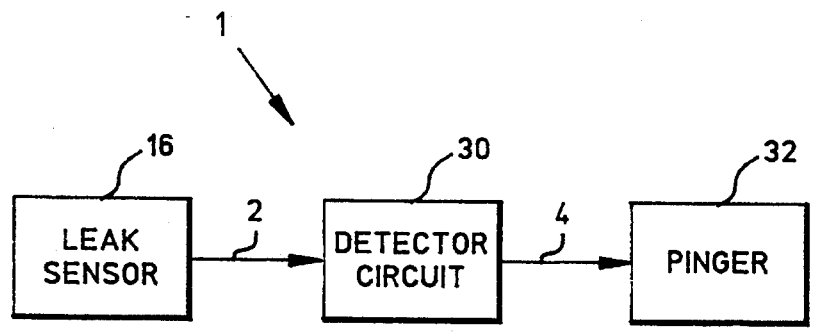
FIG. 1 is a block diagram of a leak detector embodying various features of the invention.

In the block diagram of FIG. 1, a leak detector 1 comprises a leak sensor 16 which outputs an electrical signal 2 to a detector circuit 30 if a boiler breach is sensed by leak sensor 16. Upon receipt of signal 2, detector circuit 30 outputs an alarm signal 4 to control the frequency-repetition rate of a pinger 32. Upon receipt of alarm signal 4, pinger 32 broadcasts an alarm, for example an audible tone. Detector circuit 30 and pinger 32 may be located remotely from leak sensor 16 to avoid thermal stress from leaking fluid. Detector circuit 30 may activate pinger 32 after a delay to allow pinger 32 to be used for functions other than leak detection before communicating alarm signal 4 to pinger 32.

An example of an application of leak detector 1 is the detection of a breach in a boiler or vessel of an electrically conducting fluid, such as molten lithium. In the cutaway view of FIG. 2, a lithium boiler 10 contains an electrically conductive fluid 13 between end walls 11, and is surrounded by layers of thermal-electrical insulation 12. A heat-resistant, electrically conductive casing 14 surrounds boiler 10 and insulation 12 and is connected to electrical ground 15. Leak sensor 16 is inserted between layers of insulation 12 to sense the presence of electrically conductive fluid 13 leaking from boiler 10. Leak sensor 16 is thermally and electrically insulated from boiler 10 and casing 14 by insulation 12.

Figure 2:
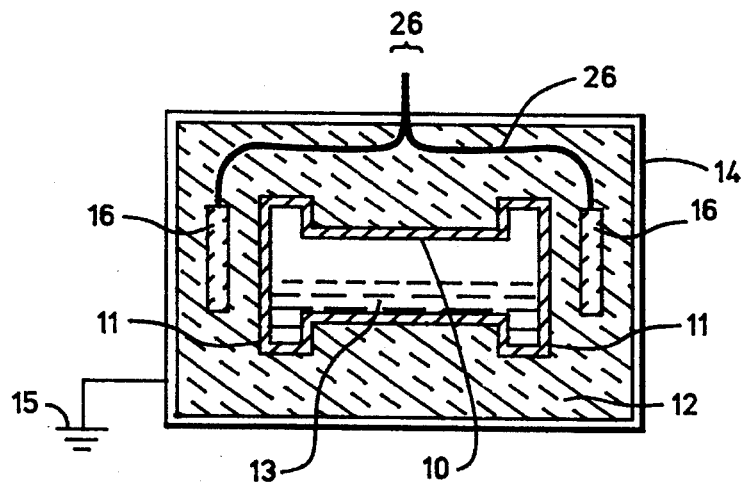
FIG. 2 is a cutaway view of a boiler and the leak sensor of the leak detector.
Figure 3:
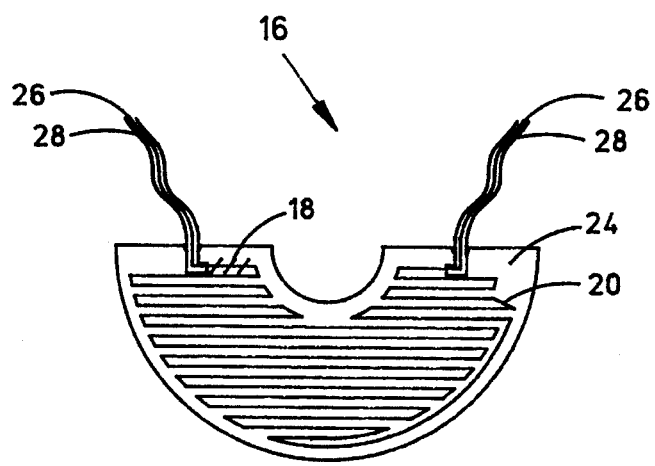
FIG. 3 is a top view detail of the leak sensor.

Referring to the top view detail of FIG. 3, leak sensor 16 comprises a flexible, electrically conductive wire 20 stitched with partially shown heat resistant thread 18 to heat resistant, electrically insulative fabric 24. Fabric 24 is sufficiently porous to allow any fluid 13 in FIG. 2 that may leak from a breach in boiler 10 to permeate fabric 24 and contact wire 20. Thread 18 and fabric 24 may be ASTROQUARTZ, for example, which can withstand temperatures to about 2,200 degrees Fahrenheit. Wire 20 may be 99.9% annealed silver with a diameter of 0.02 inches. Silver is preferable for use with molten lithium because silver has a melting point that is higher than the temperature at the location of leak sensor 16, which is around 2,000 degrees Fahrenheit or less, and is also less than that of the molten lithium inside the boiler, which may be about 3,000 degrees Fahrenheit. Stitching wire 20 to fabric 24 with thread 18 holds wire 20 in a fixed pattern during handling and operation. Wire 20 is connected by lead wires 26 sheathed with heat resistant electrical insulation 28. Insulation 28 may be NEXTEL, for example, a braided insulation material available from 3M Corporation, which can withstand temperatures of about 2,200 degrees Fahrenheit. Several sections of leak sensor 16 may be configured in various shapes and electrically connected in series.

Figure 4:
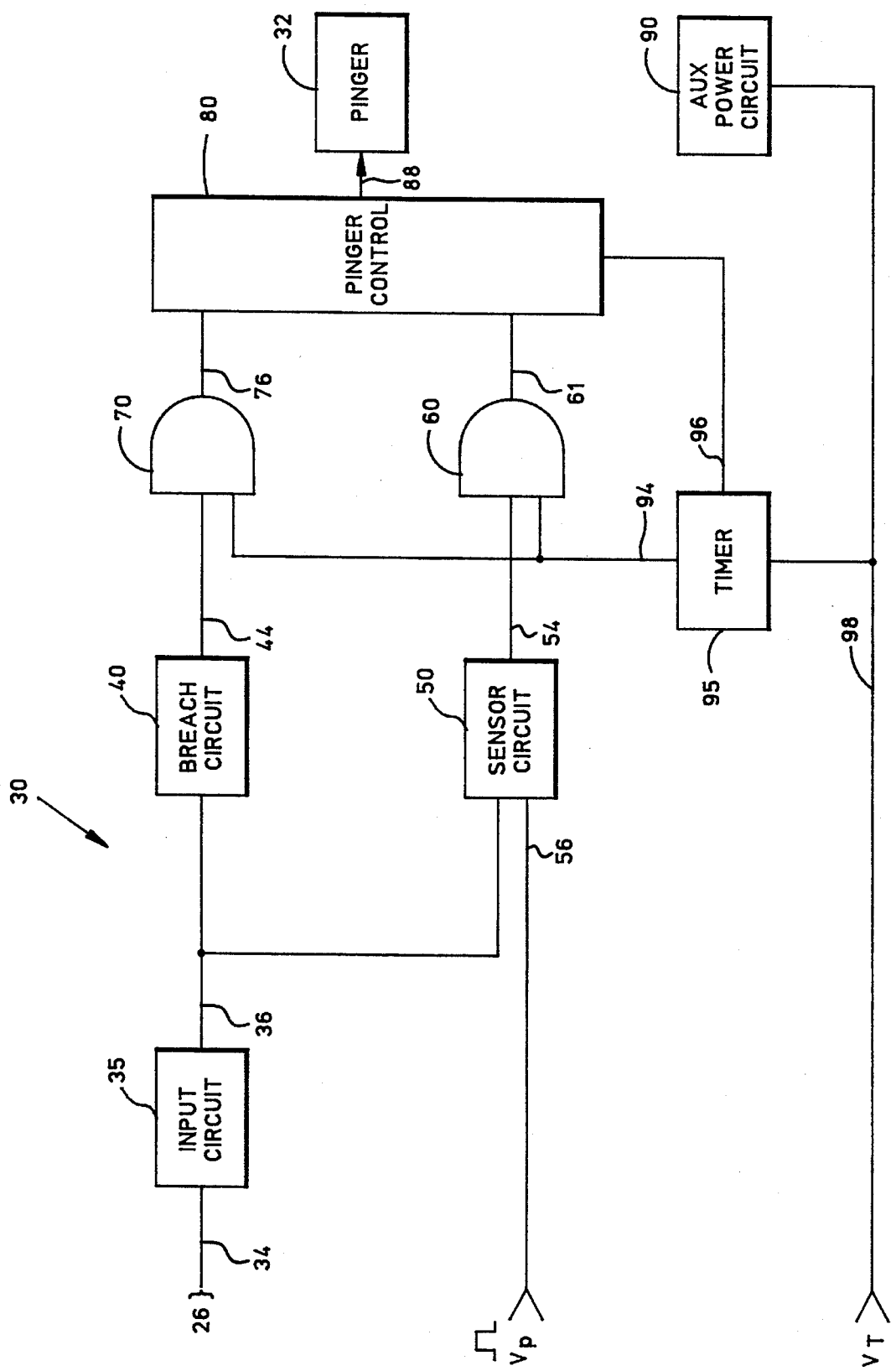
FIG. 4 is a block diagram of an example of a detector circuit for the leak detector.

An example of a detector circuit 30 shown in the block diagram of FIG. 4 comprises an input circuit 35 which receives a signal on line 34 from lead wires 26 of leak sensor 16 shown in FIG. 2. An electrical signal appearing or present on a given signal line may be referred to hereafter using the same reference as the signal line, for example, the signal on line 34 may also be referred to as "signal 34". Input circuit 35 outputs a signal 36 to a breach circuit 40 and to a sensor circuit 50 if wire 20 of leak sensor 16 is fused open or short circuited to casing 14 by leaking fluid 13.

Sensor circuit 50 outputs a latched signal 54 to an AND gate 60 if signal 36 is present when a powerup voltage pulse $V_p$ on signal line 56 is provided to sensor circuit 50. AND gate 60 outputs a signal 61 if signal 54 is present when a signal 94 is received by AND gate 60 from a timer 95. Signal 94 from timer 95 enables gate 60 about four minutes after a power voltage $V_T$ on a signal line 98 is removed from detector circuit 30. Upon receipt of signal 61, pinger control 80 may change the frequency-repetition rate of pinger 32 via signal line 88 to indicate that leak sensor 16 is missing, short circuited, or open circuited when voltage $V_p$ is applied at powerup.

Upon receipt of signal 36, breach circuit 40 outputs a latched signal 44 to an AND gate 70. AND gate 70 is further enabled by signal 94 from timer 95. AND gate 70 then outputs a signal 76 to pinger control 80. Pinger control 80 may change the frequency-repetition rate of pinger 32 via signal line 88 to indicate that a boiler leak has occurred. Timer 95 outputs a signal 96 to pinger control 80 to reset the frequency-repetition rate, for example, about two minutes after power voltage $V_T$ is first applied to detector circuit 30. The frequency-repetition rate of pinger 32 may be changed by pinger control 80 in accordance with well-known techniques, such as using a relay to switch tuning components of pinger 32.

Figure 5:
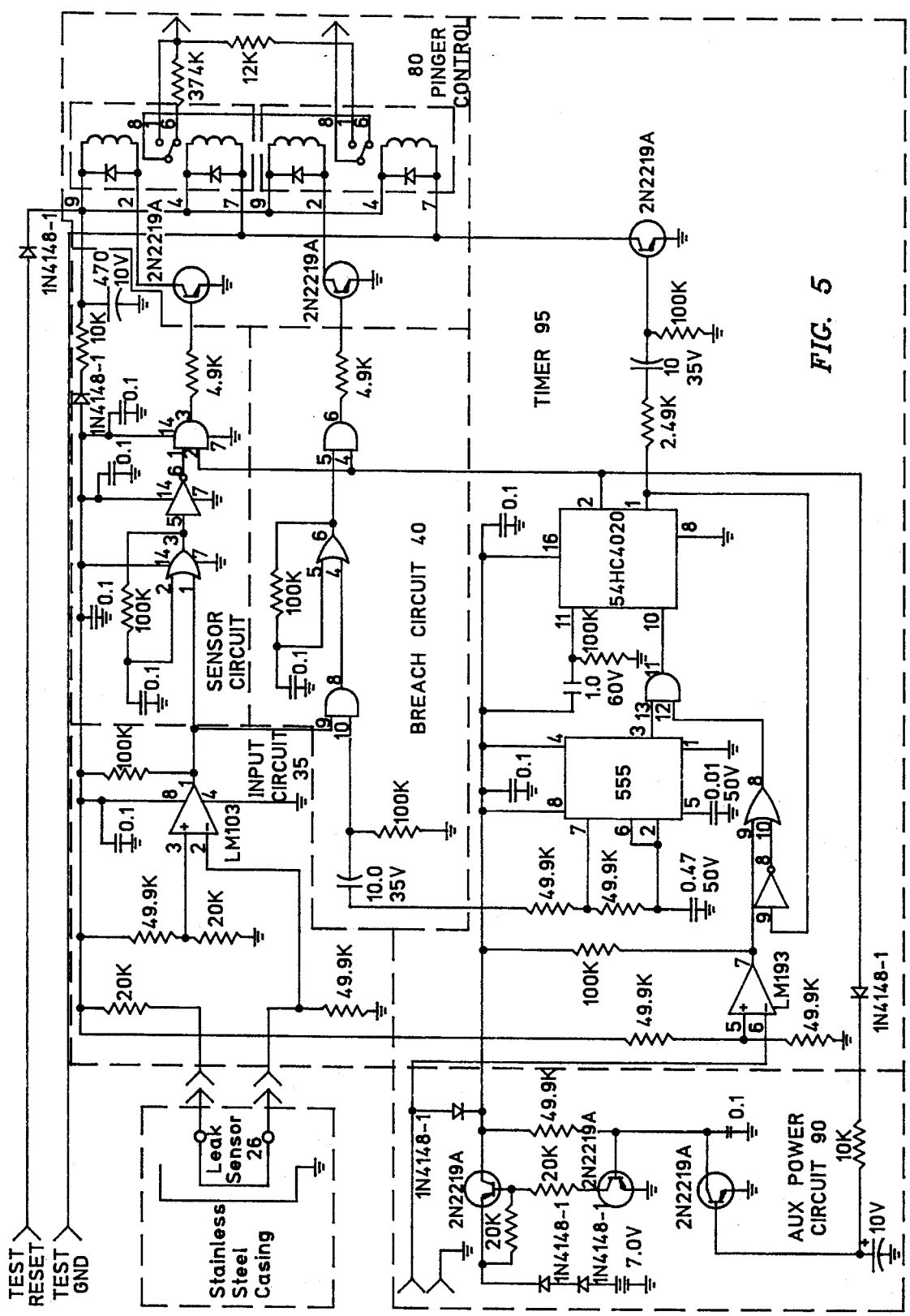
FIG. 5 is an example of a schematic for the circuit of FIG. 4.

An auxiliary power circuit 90 senses power voltage $V_T$ on signal line 98, and provides auxiliary power to detector circuit 30 after power voltage $V_T$ is removed. A schematic of an example of a circuit for performing the functions of detector circuit 30 is shown in FIG. 5.

If a boiler breach occurs, fluid 13 shown in FIG. 2 permeates fabric 24 of leak sensor 16 to wire 20 shown in FIG. 3, fusing wire 20. The continuity of wire 20 is changed by fusing of wire 20 or by fluid 13 short circuiting wire 20 to casing 14. A corresponding voltage change on leads 26 appears on signal line 34 of input circuit 35 shown in FIG. 4. Input circuit 35 outputs signal 36 to breach circuit 40. Breach circuit 40 outputs signal 44, partially enabling gate 70. When timer 95 fully enables gate 70, pinger control 80 changes the frequency-repetition rate of pinger 32 via signal line 88 to signal that a boiler leak has occurred. If leak sensor 16 is missing or malfunctioning when voltage pulse $V_p$ is applied to detector circuit 30, sensor circuit 50 and timer 95 enable gate 60 to output signal 61. Pinger control 80 may use signal 61 to change the frequency-repetition rate of pinger 32 via signal line 88 to indicate a leak condition from leak sensor 16 when power is first applied to detector circuit 30, which may occur if leak sensor 16 is defective or was not properly connected to detector circuit 30.

Other embodiments of the leak detector may be used with other containers of electrically conductive fluid, such as heat exchangers.

Other modifications, variations, and applications of the present invention may be made in accordance with the above teachings other than as specifically described to practice the invention within the scope of the following claims.

What is claimed is:

1. A leak detector for detecting an electrically conductive fluid, comprising:

a leak sensor comprising an electrically conductive wire, a heat resistant, electrically insulative fabric for supporting the wire, and a heat resistant thread for stitching the wire to the fabric;

a detector electrically connected to the wire for generating a detector output signal when the wire is fused by contact with the conductive fluid;

a breach alarm having an input operably coupled to receive the detector output signal for generating a breach alarm signal when the wire fuses; and a sensor alarm operably coupled to receive the detector output signal for generating a sensor alarm signal if the detector output signal is received from the detector when the wire has not fused.

2. The leak detector of claim 1, wherein the fluid is molten lithium.

3. The leak detector of claim 2, further comprising:

a molten lithium boiler containing the fluid;

a first layer of insulation covering the boiler for thermally and electrically insulating the leak sensor from the boiler;

a second layer of insulation coveting the boiler and the leak sensor; and a heat-resistant, electrically conductive casing coveting the second insulation layer.

4. The leak detector of claim 3, further comprising a circuit operably coupled to the casing, the detector, and the sensor alarm for signaling a short-circuit between the wire and the casing.

\* \* \* \* \*